(12) United States Patent
McRae et al.

(10) Patent No.: US 8,719,078 B1
(45) Date of Patent: *May 6, 2014

(54) INDEX FOR ASSESSING DISCOUNT POTENTIAL

(71) Applicant: JPMorgan Chase Bank, N.A., New York, NY (US)

(72) Inventors: Xuan McRae, Fremont, CA (US); Mathew Roland, San Francisco, CA (US); George Fan, Pleasanton, CA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/904,663

(22) Filed: May 29, 2013

Related U.S. Application Data (63) Continuation of application No. 12/099,572, filed on Apr. 8, 2008, now Pat. No. 8,478,637.

(51) Int. Cl.
   *G06Q 40/00* (2012.01)
   *G06Q 30/00* (2012.01)

(52) U.S. Cl.
   CPC .................................... *G06Q 30/00* (2013.01)
   USPC ................... 705/14; 705/35; 705/38; 705/39; 705/37; 705/26

(58) Field of Classification Search
   USPC .............. 705/14, 10, 28, 30, 35, 37; 709/219; 725/116
   See application file for complete search history.

(56) References Cited

U.S. PATENT DOCUMENTS

| | | | |
|---|---|---|---|
| 3,634,699 A | 1/1972 | Soumas et al. | |
| 4,338,587 A | 7/1982 | Chiappetti | |
| 4,346,442 A | 8/1982 | Musmanno | |
| 4,355,372 A | 10/1982 | Goldberg et al. | |
| 4,376,978 A | 3/1983 | Musmanno | |

(Continued)

FOREIGN PATENT DOCUMENTS

| | | |
|---|---|---|
| EP | 0597316 | 5/1994 |
| JP | 2002-109435 | 4/2002 |

(Continued)

OTHER PUBLICATIONS

A. Spoerri, Visual tools for information retrieval (Abstract), Proc. IEEE Symp. Visual Languages, pp. 160-168 (Aug. 1993).

(Continued)

*Primary Examiner* — Tien Nguyen
(74) *Attorney, Agent, or Firm* — Lowenstein Sandler LLP (57) ABSTRACT

A computerized system and method of calculating a discount index value for a supplier can include receiving information related to a plurality of discount leverage factors for the supplier, calculating a discount index value for the supplier based on the information related to the discount leverage factors, receiving information related to an actual discount event for the supplier, recalculating the discount index value for the supplier based on the discount leverage factors and the information related to actual discount events, and displaying the discount index value for the supplier. The system and method can also include placing the discount index value on a discount index scale, defining a plurality of discount leverage regions on the discount index scale, and attributing a leverage value to the supplier based on the proximity of the discount index value to one of the discount leverage regions.

21 Claims, 4 Drawing Sheets

(56) References Cited

U.S. PATENT DOCUMENTS

| | | | | |
|---|---|---|---|---|
| 4,597,046 | A | 6/1986 | Musmanno et al. | |
| 4,598,367 | A | 7/1986 | DeFrancesco et al. | |
| 4,642,768 | A | 2/1987 | Roberts | |
| 4,674,042 | A | 6/1987 | Hernandez et al. | |
| 4,674,044 | A | 6/1987 | Kalmus et al. | |
| 4,736,294 | A | 4/1988 | Le Grand et al. | |
| 4,739,478 | A | 4/1988 | Roberts et al. | |
| 4,760,604 | A | 7/1988 | Cooper | |
| 4,774,663 | A | 9/1988 | Musmanno et al. | |
| 4,774,664 | A | 9/1988 | Gottardy et al. | |
| 4,831,526 | A | 5/1989 | Luchs | |
| 4,859,187 | A | 8/1989 | Peterson | |
| 4,859,837 | A | 8/1989 | Halpern | |
| 4,866,634 | A | 9/1989 | Reboh | |
| 4,897,811 | A | 1/1990 | Scofield | |
| 4,903,201 | A | 2/1990 | Wagner | |
| 4,972,504 | A | 11/1990 | Daniel, Jr. | |
| 5,041,972 | A | 8/1991 | Frost | |
| 5,093,907 | A | 3/1992 | Hwong et al. | |
| 5,220,500 | A | 6/1993 | Baird | |
| 5,227,874 | A | 7/1993 | Von Kohorn | |
| 5,231,571 | A | 7/1993 | D'Agostino | |
| 5,245,535 | A | 9/1993 | Weiss et al. | |
| 5,278,751 | A | 1/1994 | Adiano | |
| 5,297,032 | A | 3/1994 | Trojan et al. | |
| 5,321,933 | A | 6/1994 | Seifert et al. | |
| 5,351,187 | A | 9/1994 | Hassett | |
| 5,381,470 | A | 1/1995 | Cambray et al. | |
| 5,396,621 | A | 3/1995 | MacGregor et al. | |
| 5,444,844 | A | 8/1995 | Inoue | |
| 5,481,647 | A | 1/1996 | Brody | |
| 5,490,060 | A | 2/1996 | Malec | |
| 5,502,805 | A | 3/1996 | Anderson et al. | |
| 5,523,942 | A | 6/1996 | Tyler et al. | |
| 5,550,734 | A | 8/1996 | Tater | |
| 5,551,021 | A | 8/1996 | Harada | |
| 5,583,778 | A | 12/1996 | Wind | |
| 5,592,590 | A | 1/1997 | Jolly | |
| 5,603,025 | A | 2/1997 | Tabb | |
| 5,606,496 | A | 2/1997 | D'Agostino | |
| 5,611,052 | A | 3/1997 | Dykstra | |
| 5,615,109 | A | 3/1997 | Eder | |
| 5,615,341 | A | 3/1997 | Srikant et al. | |
| 5,623,591 | A | 4/1997 | Cseri | |
| 5,644,727 | A | 7/1997 | Atkins | |
| 5,649,116 | A | 7/1997 | McCoy | |
| 5,649,118 | A | 7/1997 | Carlisle et al. | |
| 5,655,085 | A | 8/1997 | Ryan | |
| 5,657,388 | A | 8/1997 | Weiss | |
| 5,657,437 | A | 8/1997 | Bishop et al. | |
| 5,657,460 | A | 8/1997 | Egan et al. | |
| 5,664,127 | A | 9/1997 | Anderson et al. | |
| 5,671,363 | A | 9/1997 | Cristofich et al. | |
| 5,675,746 | A | 10/1997 | Marshall | |
| 5,689,650 | A | 11/1997 | McClelland | |
| 5,717,865 | A | 2/1998 | Stratmann | |
| 5,721,847 | A | 2/1998 | Johnson | |
| 5,727,161 | A | 3/1998 | Purcell, Jr. | |
| 5,732,397 | A | 3/1998 | DeTore | |
| 5,758,328 | A | 5/1998 | Giovannoli | |
| 5,764,923 | A | 6/1998 | Tallman et al. | |
| 5,765,144 | A | 6/1998 | Larche | |
| 5,768,158 | A | 6/1998 | Adler et al. | |
| 5,774,878 | A | 6/1998 | Marshall | |
| 5,774,883 | A | 6/1998 | Anderson et al. | |
| 5,793,852 | A | 8/1998 | Kang et al. | |
| 5,799,286 | A | 8/1998 | Morgan et al. | |
| 5,802,502 | A | 9/1998 | Gell | |
| 5,812,968 | A | 9/1998 | Hassan | |
| 5,819,237 | A | 10/1998 | Garman | |
| 5,842,178 | A | * | 11/1998 | Giovannoli ............... 705/26.4 |
| 5,848,400 | A | 12/1998 | Chang | |
| 5,852,811 | A | 12/1998 | Atkins | |
| 5,870,721 | A | 2/1999 | Norris | |
| 5,873,096 | A | 2/1999 | Lim | |
| 5,875,437 | A | 2/1999 | Atkins | |
| 5,878,258 | A | 3/1999 | Pizi | |
| 5,878,403 | A | 3/1999 | Agrawal et al. | |
| 5,913,202 | A | 6/1999 | Motoyama | |
| 5,918,217 | A | 6/1999 | Maggioncalda | |
| 5,920,848 | A | 7/1999 | Schutzer et al. | |
| 5,930,775 | A | 7/1999 | McCauley | |
| 5,940,811 | A | 8/1999 | Norris | |
| 5,940,812 | A | 8/1999 | Tengel et al. | |
| 5,950,175 | A | 9/1999 | Austin | |
| 5,963,953 | A | 10/1999 | Cram et al. | |
| 5,970,467 | A | 10/1999 | Alavi | |
| 5,974,396 | A | 10/1999 | Anderson et al. | |
| 5,978,779 | A | 11/1999 | Stein et al. | |
| 5,983,206 | A | 11/1999 | Oppenheimer | |
| 5,987,434 | A | 11/1999 | Libman | |
| 5,991,741 | A | 11/1999 | Speakman et al. | |
| 5,995,942 | A | * | 11/1999 | Smith et al. ............... 705/14.26 |
| 5,999,907 | A | 12/1999 | Donner | |
| 6,008,817 | A | 12/1999 | Gilmore, Jr. | |
| 6,009,415 | A | 12/1999 | Shurling et al. | |
| 6,018,722 | A | 1/2000 | Ray et al. | |
| 6,021,397 | A | 2/2000 | Jones et al. | |
| 6,026,370 | A | * | 2/2000 | Jermyn ............... 705/14.41 |
| 6,029,139 | A | 2/2000 | Cunningham et al. | |
| 6,029,195 | A | 2/2000 | Herz | |
| 6,032,125 | A | 2/2000 | Ando | |
| 6,044,371 | A | 3/2000 | Person et al. | |
| 6,055,510 | A | * | 4/2000 | Henrick et al. ............ 705/14.53 |
| 6,055,517 | A | 4/2000 | Friend et al. | |
| 6,064,985 | A | 5/2000 | Anderson | |
| 6,070,147 | A | * | 5/2000 | Harms et al. ............... 705/14.25 |
| 6,073,115 | A | 6/2000 | Marshall | |
| 6,076,072 | A | 6/2000 | Libman | |
| 6,078,892 | A | 6/2000 | Anderson et al. | |
| 6,078,901 | A | 6/2000 | Ching | |
| 6,088,686 | A | 7/2000 | Walker et al. | |
| 6,089,284 | A | 7/2000 | Kaehler et al. | |
| 6,092,050 | A | 7/2000 | Lungren et al. | |
| 6,097,391 | A | 8/2000 | Wilcox | |
| 6,108,641 | A | 8/2000 | Kenna et al. | |
| 6,122,623 | A | 9/2000 | Garman | |
| 6,154,731 | A | 11/2000 | Monks et al. | |
| 6,173,270 | B1 | 1/2001 | Cristofich et al. | |
| 6,185,582 | B1 | 2/2001 | Zellweger et al. | |
| 6,188,403 | B1 | 2/2001 | Sacerdoti et al. | |
| 6,188,405 | B1 | 2/2001 | Czerwinski et al. | |
| 6,188,993 | B1 | 2/2001 | Eng et al. | |
| 6,195,092 | B1 | 2/2001 | Dhond et al. | |
| 6,199,077 | B1 | 3/2001 | Inala et al. | |
| 6,202,053 | B1 | 3/2001 | Christiansen et al. | |
| 6,202,054 | B1 | 3/2001 | Lawlor et al. | |
| 6,205,453 | B1 | 3/2001 | Tucker et al. | |
| 6,212,494 | B1 | 4/2001 | Boguraev | |
| 6,222,557 | B1 | 4/2001 | Pulley, IV et al. | |
| 6,236,978 | B1 | 5/2001 | Tuzhilin | |
| 6,243,093 | B1 | 6/2001 | Czerwinski et al. | |
| 6,249,775 | B1 | 6/2001 | Freeman et al. | |
| 6,256,649 | B1 | 7/2001 | Mackinlay et al. | |
| 6,263,320 | B1 | 7/2001 | Danilunas et al. | |
| 6,269,346 | B1 | 7/2001 | Cristofich et al. | |
| 6,271,863 | B1 | 8/2001 | Bose et al. | |
| 6,278,981 | B1 | 8/2001 | Dembo et al. | |
| 6,282,551 | B1 | 8/2001 | Anderson et al. | |
| 6,311,144 | B1 | 10/2001 | Abu Et Ata | |
| 6,317,726 | B1 | 11/2001 | O'Shaughnessy | |
| 6,317,750 | B1 | 11/2001 | Tortolani et al. | |
| 6,321,212 | B1 | 11/2001 | Lange | |
| 6,330,551 | B1 | 12/2001 | Burchetta et al. | |
| 6,349,290 | B1 | 2/2002 | Horowitz et al. | |
| 6,349,291 | B1 | 2/2002 | Varma | |
| 6,351,738 | B1 | 2/2002 | Clark | |
| 6,360,188 | B1 | 3/2002 | Freidman et al. | |
| 6,363,393 | B1 | 3/2002 | Ribitzky | |
| 6,405,204 | B1 | 6/2002 | Baker et al. | |
| 6,452,613 | B1 | 9/2002 | Lefebvre et al. | |
| 6,490,569 | B1 | 12/2002 | Grune et al. | |
| 6,496,832 | B2 | 12/2002 | Chi et al. | |
| 6,502,080 | B1 | 12/2002 | Eichorst et al. | |

(56) References Cited

U.S. PATENT DOCUMENTS

| | | | |
|---|---|---|---|
| 6,513,018 B1 | 1/2003 | Culhane | |
| 6,597,379 B1 | 7/2003 | Morris et al. | |
| 6,601,044 B1 | 7/2003 | Wallman | |
| 6,624,752 B2 | 9/2003 | Klitsgaard et al. | |
| 6,725,257 B1 | 4/2004 | Cansler et al. | |
| 6,741,975 B1 | 5/2004 | Nakisa et al. | |
| 6,785,661 B1 | 8/2004 | Mandler et al. | |
| 6,850,923 B1 | 2/2005 | Nakisa et al. | |
| 6,892,052 B2 | 5/2005 | Kotola et al. | |
| 6,985,880 B1 | 1/2006 | Hodgdon et al. | |
| 6,999,943 B1 | 2/2006 | Johnson et al. | |
| 7,181,427 B1 | 2/2007 | DeFrancesco et al. | |
| 7,406,442 B1 | 7/2008 | Kottmeier, Jr. | |
| 7,409,364 B1 | 8/2008 | Barton et al. | |
| 2001/0011243 A1 | 8/2001 | Dembo et al. | |
| 2001/0027437 A1 | 10/2001 | Turbeville et al. | |
| 2001/0056398 A1 | 12/2001 | Scheirer | |
| 2002/0007330 A1 | 1/2002 | Kumar et al. | |
| 2002/0019791 A1 | 2/2002 | Goss et al. | |
| 2002/0019802 A1 | 2/2002 | Malme et al. | |
| 2002/0019803 A1 | 2/2002 | Muller | |
| 2002/0059139 A1 | 5/2002 | Evans | |
| 2002/0067373 A1 | 6/2002 | Roe et al. | |
| 2002/0073005 A1 | 6/2002 | Welnicki et al. | |
| 2002/0078086 A1 | 6/2002 | Alden et al. | |
| 2002/0111850 A1* | 8/2002 | Smrcka et al. | 705/10 |
| 2002/0111890 A1 | 8/2002 | Sloan et al. | |
| 2002/0133383 A1 | 9/2002 | Chao et al. | |
| 2002/0147668 A1 | 10/2002 | Smith et al. | |
| 2002/0198797 A1 | 12/2002 | Cooper et al. | |
| 2003/0018492 A1 | 1/2003 | Carlson | |
| 2003/0028466 A1 | 2/2003 | Jenson et al. | |
| 2003/0061132 A1* | 3/2003 | Yu et al. | 705/30 |
| 2003/0061137 A1* | 3/2003 | Leung et al. | 705/35 |
| 2003/0093351 A1 | 5/2003 | Sarabanchong | |
| 2003/0212628 A1 | 11/2003 | Kuttan et al. | |
| 2003/0216965 A1* | 11/2003 | Libman | 705/14 |
| 2003/0229582 A1 | 12/2003 | Sherman et al. | |
| 2004/0030626 A1 | 2/2004 | Libman | |
| 2004/0039588 A1 | 2/2004 | Libman | |
| 2004/0039666 A1* | 2/2004 | Fudali et al. | 705/35 |
| 2004/0054610 A1 | 3/2004 | Amstutz et al. | |
| 2004/0054622 A1 | 3/2004 | Strayer et al. | |
| 2004/0117300 A1 | 6/2004 | Jones et al. | |
| 2004/0186773 A1* | 9/2004 | George et al. | 705/14 |
| 2004/0236641 A1* | 11/2004 | Abbott et al. | 705/28 |
| 2004/0267651 A1 | 12/2004 | Jenson et al. | |
| 2005/0004855 A1 | 1/2005 | Jenson et al. | |
| 2005/0004856 A1 | 1/2005 | Brose et al. | |
| 2005/0010510 A1 | 1/2005 | Brose et al. | |
| 2005/0027632 A1 | 2/2005 | Zeitoun et al. | |
| 2005/0060252 A1 | 3/2005 | Doddington | |
| 2005/0144108 A1 | 6/2005 | Loeper | |
| 2006/0136323 A1 | 6/2006 | Barry et al. | |
| 2010/0274729 A1* | 10/2010 | Holm et al. | 705/80 |

FOREIGN PATENT DOCUMENTS

| | | |
|---|---|---|
| JP | 2002-163589 | 6/2002 |
| JP | 2005-122748 | 5/2005 |
| WO | 99/27479 | 6/1999 |
| WO | 00/02256 | 1/2000 |
| WO | 02/069212 | 9/2002 |

OTHER PUBLICATIONS

Altegris Investments, Why a Fund of Funds?, http://www.managedinvestments.com/hedge_fund_of_funds.html (last visited Jul. 24, 2002).

Amex-Costco Co-brand: Is it a Marketing or Merchant Acceptance Strategy?, Card News, Aug. 25, 1999, at 1.

Association for Financial Professionals CIEBA, Derivatives Primer, Dec. 2001.

C. Stolte et al, Polaris: a system for query, analysis and visualization of multidimensional relational databases (Abstract), IEEE Transactions Visualization and Computer Graphics, Jan./Mar. 2002, at 62-65.

Christine R. Hekman, A Financial Model of Foreign Exchange Exposure, 16 J. Int'l Bus. Studies 83 (Summer 1985).

Claire E. Taylor et al, Card issuers turn to scoring as they face increasing risk, Fin. Services Rep., Jul. 24, 1991, at 1.

CNET Networks, Inc., C|NET Download.com, GS-Calc 6.0.1.1, http://www.download.com (last visited Sep. 30, 2003).

CNET Networks, Inc., C|NET Download.com, Spreadsheet Mapper 2.0.2, http://www.download.com (last visited Sep. 30, 2003).

CNET Networks, Inc., C|NET Download.com, TCS 4.20, http://www.download.com (last visited Sep. 30, 2003).

Credit Scoring New Markets (Credit disadvantaged people are proving to be a lucrative lending market for banks), Bank Tech. News, Jul. 1996, at 1.

D.E. Snyder et al, Indentifying design requirements using integrated analysis structures (Abstract), Proc. IEEE Nat'l Aerospace Electronics Conf., vol. 2 pp. 786-792 (May 1991).

Deidre Sullivan, Scoring borrower-risk, Mortgage Banking, Nov. 1994, at 94.

Derivatives Study Center, Primer: Derivatives Instruments, http://www.econstrat.org/dscinstruments.htm (last visited Jul. 24, 2002).

E.H. Chi et al, Principles for information visualization spreadsheets (Abstract), IEEE Computer Graphics and Applications, Jul./Aug. 1998, at 30-38.

Farzin Pourmokhtar (ed.), A Hedge Fund Primer Version 0.1, http://www.emf.net/~farzin/hedgefund.html (last visited Jul. 24, 2002).

Frank Armstrong, Investor Solutions, Inc., Fund of Funds: Perfect Solution or Dangerous Shortcut, http://www.investorsolutions.com/Premier/Printable.cfm?Article=art_Fund_of_funds.cfm (last visited Jul. 24, 2002).

Fred Portner, There Must Be a Better Way, Mortgage Banking, Nov. 1992, at 12.

FreeMarkets Online, Inc., http://www.freemarkets.com (last visited Apr. 1999).

G. Davenport et al, Numbers—a medium that counts (Abstract), IEEE Computer Graphics and Applications, Jul. 1991, at 39-44.

H.J. Gottfried et al, Graphical definitions: making spreadsheets visual through direct manipulation and gestures (Abstract), Proc. IEEE Symp. Visual Languages, pp. 246-253 (Sep. 1997).

HedgeFund.net, Hedge Fund Primer—About Fund of Funds, http://www.hedgefund.net/prime_fof.php3 (last visited Jul. 24, 2002).

Henry Kneis, Hedge Fund Strategies: A Primer, Canadian Hedge Watch, Dec. 15, 2001, at 3.

Intuit, Inc., Open Financial Exchange, Specification 2.0 Tax Extensions Version 1.0 (Jun. 30, 2000).

J. Buchner et al, HotDoc: a flexible framework for spatial composition (Abstract), Proc. IEEE Symp. Visual Languages, pp. 92-99 (Sep. 1997).

James J. Carey, The Sub-Prime Credit Market: Identifying Good Risks for Unsecured Cards, Credit World, Sep. 1996, at 13.

Jane Bryant Quinn, Credit Issuers Keeping a Closer Watch on How You Pay Bills, Wash. Post, Apr. 25, 1988 at p. 6.

Jesse Snyder, Opportunity Knocks at Scoring's Door, Collections & Credit Risk, Apr. 1997, at 53.

John C. Bogle, Founder and Chairman, The Vanguard Group, Address to the '40 Act Institute of the Practising Law Institute: Mutual Funds at the Millennium: Fund Directors and Fund Myths (May 15, 2000).

John C. Roger et al, A Credit Scoring Model to Evaluate the Creditworthiness of Cred Card Applicants, Developments Marketing Sci., 1982.

John Markese, Can You Trust Mutual Fund Rankings?, Consumers' Res. Magazine, Oct. 1993, at 20.

Kmart MasterCard, CardTrak Online, http://www.cardweb.com/cardtrak/news/2000/september/26a.html (Sep. 26, 2000) (last visited Nov. 6, 2009).

KSP Capital Management, LLC, Hedge Fund Primer, http://www.kspcapital.com/primer/edu1.htm (last visited Jul. 24, 2002).

Latimer ASCH, How the RMA/Fair, Isaac credit-scoring model was built, J. Comm. Lending, Jun. 1995, at 10.

Lea Purcell, Using Software to Soften Big-Time Competition, Bank Systems Tech., Jun. 1994, at 38.

(56) References Cited

OTHER PUBLICATIONS

Lee A. Spirer, When "bad" credit behavior becomes the norm, Credit World, Jul./Aug. 1997, at 18.

LendingTree Mortgage Application, www.lendingtree.com (last visited Feb. 1, 1999).

Marc Friedland, Credit Scoring Digs Deeper Into Data, Credit World, May 1996, at 19.

Michael deCourcy Hinds, Making the most of fast-falling interest rates, N.Y. Times, Jun. 30, 1985, at 1.

Peter Pae, Boycott Threat Spurs American Express to Rethink Fees, Wall. St. J., Mar. 28, 1999, at B1.

Phillip Storms, Using mortgage credit to achieve client objectives, 9 J. Fin. Planning 77 (Oct. 1996).

Posting of "Jazzy Jeff" to Credit Card Commentaries: Kmart MasterCard, http://www.cardoffers.com (Feb. 25, 2003).

Product Data Integration Technologies, Inc., http:/www.pdit.com (last visited Apr. 26, 1999).

Robert E. Cumby et al, Evaluating the Performance of International Mutual Funds, XLV J. Fin. 497 (Jun. 1990).

Robyn Meredith, Internet bank moves closer to virtual reality, USA Today, May 5, 1995, at B1.

Ron Jameson, Expanding Risk Management Strategies: Key to Future Survival, Credit World, May 1996, at 16.

Tax Executives Inst. Wis. Chapter, Wisconsin Department of Revenue Liaison Meeting, The Tax Executive, Mar.-Apr. 1995.

The Turin Group, Trading and Capital-Markets Activities Manual, http://www.toerien.com/books/manual/4040.htm (last visited Jul. 24, 2002).

Tim McLaughlin, Tapping Web to search for right fund—FundProfiler speeds search, Boston Herald, Dec. 16, 1999, at 70.

Two chips can be better than one, Card Tech., May 2001, at 40.

Ulrich Schreiber et al, Measuring the Impact of Taxation on Investment and Financing Decisions, Schmalenbach Bus. Rev., Jan. 2002, at 2-23.

William M Makuch et al, Managing Consumer Credit Delinquency in the US Economy: A Multi-Billion Dollar Management Science Application, Interfaces, Jan./Feb. 1992, at 90.

Wingspan Bank, At Your Request, http://www.wingspanbank.com (last visited Aug. 10, 1999).

Xiaoyan Li, Time-based language models, Proc. Int'l Conf. Info. And Knowledge Mgmt., pp. 469-475 (2003).

\* cited by examiner

| INDEX FACTOR | DESCRIPTION |
|---|---|
| SUPPLIER FINANCIAL RISK | The higher the financial risk score, the higher the likelihood the company nees cash and the higher the likelihood of discount leverage. |
| SPEND LEVERAGE | The higher the buyer's spend is as a percentage of supplier revendue, the higher the likelihood of discount leverage. |
| COST OF CAPITAL DIFFERENTIAL BETWEEN SUPPLIER AND BUYER | The bigger the difference in cost of funds between the buyer and supplier, the higher the likelihood of discount leverage. |
| SUPPLIER DPO | The longer the actual time to pay the supplier, the higher the likelihood of discount leverage. In many cases, the actual DPO may be longer than the negotiated term. |
| SUPPLIER SIZE | The smaller the supplier in terms of revenue, the more likely the discount leverage. |
| INDUSTRY | The more cash poor and cyclical the industry, the higher the likelihood of discount leverage. |

INDEX FOR ASSESSING DISCOUNT POTENTIAL

CROSS-REFERENCE TO RELATED APPLICATION

This is a continuation application of U.S. patent application Ser. No. 12/099,572, titled "Index for Assessing Discount Potential," filed Apr. 8, 2008, the entire disclosure of which is hereby incorporated by reference herein.

BACKGROUND OF THE INVENTION

1. Field of the Invention

Embodiments of the invention relate to the assessment of discount potential, and more particularly, to the assessment of discount potential from suppliers, to allow buyers to capitalize on the discount potential of vendor payment terms.

2. Description of the Related Art

In industry today, companies tend to use a large number of suppliers to provide goods and services that, in turn, allow the companies to provide the goods and/or services that they provide to their customers.

In the financial transactions between companies (buyers) and suppliers, special payment terms are often negotiated. These payment terms often include special pricing discounts, and/or discounts for early payment.

Companies have found that great economic gains can be obtained by negotiating beneficial payment terms with suppliers. Due to the different circumstances of different suppliers, however, greater negotiating potential may exist with certain suppliers over other suppliers. In addition, because a large company may deal with hundreds or thousands of suppliers, most companies only have time and resources to pursue negotiations with a small subset of their entire base of suppliers.

For these reasons, there is a need for an automated, quick and efficient manner of determining with which suppliers to pursue discount negotiations, and how aggressively to pursue those negotiations.

Accordingly, there exists a need in the art for improved systems and methods for assessing discount potential of suppliers.

SUMMARY OF THE INVENTION

Embodiments of the invention solve these and other needs by providing improved systems and methods for assessing discount potential.

Embodiments of the invention are directed to a computerized system and method of calculating a discount index value for a supplier and can include receiving information related to a plurality of discount leverage factors for the supplier, calculating a discount index value for the supplier based on the information related to the discount leverage factors, receiving information related to an actual discount event for the supplier, recalculating the discount index value for the supplier based on the discount leverage factors and the information related to actual discount events, and displaying the discount index value for the supplier.

The system and method can also include placing the discount index value on a discount index scale, defining a plurality of discount leverage regions on the discount index scale and attributing a leverage value to the supplier based on the proximity of the discount index value to one of the discount leverage regions.

The system and method can also include receiving information related to a plurality of discount leverage factors for each of the suppliers, calculating a discount index value for each of the suppliers based on the information related to the discount leverage factors, receiving information related to an actual discount event for each of the suppliers, and recalculating the discount index value for each of the supplier based on the discount leverage factors and the information related to actual discount events.

The discount leverage factors can include one or more of a supplier financial risk, a spend leverage, a cost of capital differential between supplier and buyer, a supplier Days Payable Outstanding (DPO)(the number of days, on average, a business takes to pay its accounts payable), supplier size, and supplier industry.

A computerized system in accordance with embodiments of the invention can include a transaction database, for storing information related to discount events, a supplier data database, for storing information related to supplier business information, a buyer supplier information data database, for storing buyer information related to suppliers, a buyer capital database, for storing information related to the buyer's cost of capital, a discount factor database, for receiving information from a transaction database, the supplier data database, the buyer supplier information data database, and the buyer capital database, a discount calculation module, for receiving information from the discount factor database and calculating discount index values for suppliers, and a display module for displaying the calculated index values.

BRIEF DESCRIPTION OF THE DRAWINGS

Objects and advantages of the invention will become apparent upon consideration of the following detailed description, taken in conjunction with the accompanying drawings, in which like reference characters refer to like parts throughout, and in which.

It is to be understood that the above-mentioned drawing figures are provided solely to assist in describing the concepts of the present invention and may not be to scale, and are certainly not intended to be limiting in terms of the range of possible shapes and proportions well within the scope of embodiments of the invention.

DETAILED DESCRIPTION

Embodiments of the invention allow a company to understand where discounts can be realized across corporate spend categories, such as, for example, which suppliers, which pay groups and which spend categories can have realized discounts.

Embodiments also facilitate a company determining the relative rates at which discounts can be obtained in different categories, so that discount capture can be maximized.

These relative rates are calculated in view of discount leverage. As used herein, discount leverage is the relative power a company (buyer) has over a supplier in negotiating early payment and/or other discounts. By way of embodiments of the invention, this discount leverage and potential can be automatically and quantitatively determined, based on empirical data and correlation of past information related to discounts.

Figure 1:
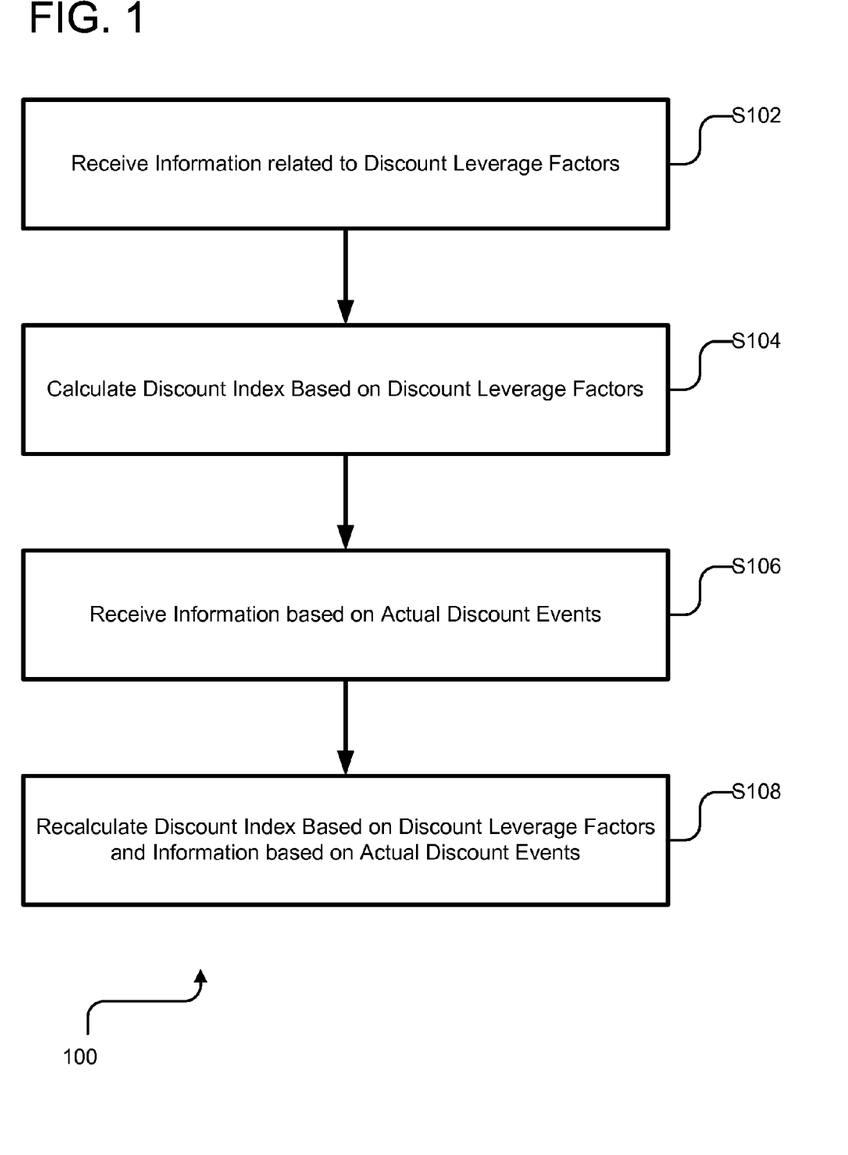
FIG. 1 is a flow diagram illustrating a method for calculating a discount index, in accordance with embodiments of the invention.

With reference to FIG. 1, there is shown a flow diagram illustrating a method 100 for calculating a discount index, in accordance with embodiments of the invention.

In accordance with the method 100, first, in step S102, information related to discount leverage factors is received. Next, in step S104, a discount index is calculated based on the received discount leverage factors. In step S106, information from actual discount events is received. Next, in step S108, the discount index for a supplier is recalculated based on the original discount leverage factors, and the information from actual discount events.

Some or all of the steps can be performed in an automated manner by way of a microprocessor based device or devices, including one or more personal computers, servers, handheld devices, such as a personal digital assistants (PDA), wireless devices, and/or other devices now known, or later developed.

Figure 2:
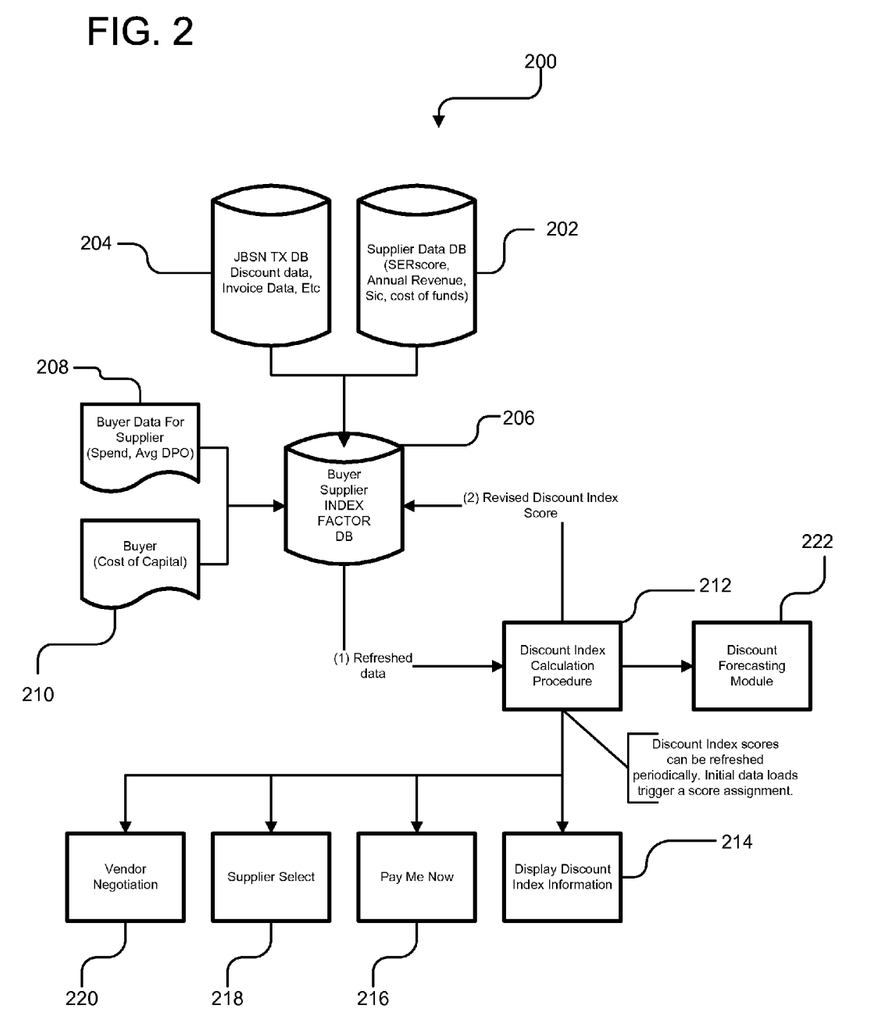
FIG. 2 is a high-level schematic diagram illustrating a system for calculating a discount index, in accordance with embodiments of the invention.

With reference to FIG. 2, there is shown a high-level schematic diagram illustrating a system 200 for calculating a discount index, in accordance with embodiments of the invention.

The system 200 can include a transaction database 204, for storing information related to discount events, a supplier data database 202, for storing information related to supplier business information, a buyer supplier information data database 208, for storing buyer information related to suppliers, and a buyer capital database 210, for storing information related to the buyer's cost of capital.

Typically, information from supplier data database 202 is obtained from third-party providers, such as are DUN & BRADSTREET, as well as other aggregators of financial and business information. Information stored at transaction database 204 is obtained primarily from historical information regarding transactions and invoices related to a supplier. Typically, information from the buyer supplier information database 208 and buyer capital database 210 will be obtained and stored by the buyer.

A discount factor database 206, receives and stores information from the transaction database 204, the supplier data database 202, the buyer supplier information data database 208, and the buyer capital database 210.

A discount calculation module 212 receives information from the discount factor database 206, and calculates discount index values for suppliers. A display module 214 displays the calculated index values from the discount calculation module 212. The index values, and other values, can be displayed in a concrete, tangible and useful format, as is known to those of skill in the art. The values can be displayed on, by way of non-limiting example, on a video monitor, or as part of a paper printout, as well as in other manners now known, or later developed.

Personnel at, for example, an accounts payable department of the buyer, can use the calculated index values for suppliers to selectively and efficiently negotiate beneficial terms with suppliers.

In addition to display module 214, information from the discount calculation module 212 can also be sent to one or more of a pay now module 216, a supplier discount select module 218, and a vendor negotiation module 220, each of which facilitate the selection of payment terms. The pay now module 216 can provide for an invoice that includes a "pay now" option, with specific payment terms listed in accordance with an immediate and quick payment. The discount select module 218 can alert a supplier when an invoice has been approved, and then provide several sets of payment terms from which the supplier can choose to be paid. The vendor negotiation module 220 facilitates a back and forth negation of payment terms, based on the output of the discount calculation module 212. Discount data related to the output of the discount calculation module is fed back to the transaction database 204, so that historical information can be used to revise or modify (i.e., tune) the discount calculations. In some embodiments, such revision can include statistical analysis methods, as known to those of skill in the art.

Each of the pay now module 216, supplier discount select module 218 and the vendor negotiation module 220 can include a computerized system, including a microprocessor, a display device, a data input device, and a memory storage device. Each of the pay now module 216, supplier discount select module 218 and the vendor negotiation module 220 can display pertinent discount information, as described above, to a supplier and/or buyer, and allow for certain selections of discount term information by a supplier and/or buyer. Discount information generated from discount calculation module 212, as well as addition discount selection information, can be stored by the pay now module 216, supplier discount select module 218 and the vendor negotiation module 220, and transmitted between a supplier and a buyer.

System 200 can also contain forecasting module 222. Forecasting module 222 receives discount information from discount calculation module 212. Discount forecasting module 222 can also receive historical and real time economic data, such a foreign and domestic financial data, trading information, and business sector information. By correlating this information with information from discount factor database 206, forecasting module 222 can forecast future discount levels to facilitate the financial planning of the buyer. In some embodiments, forecasting module 222 can use statistical forecasting techniques, as are known to those of skill in the art. Armed with information related to future discounts, a buyer can make better use of its resources than a buyer with just current discount information.

Figure 3:
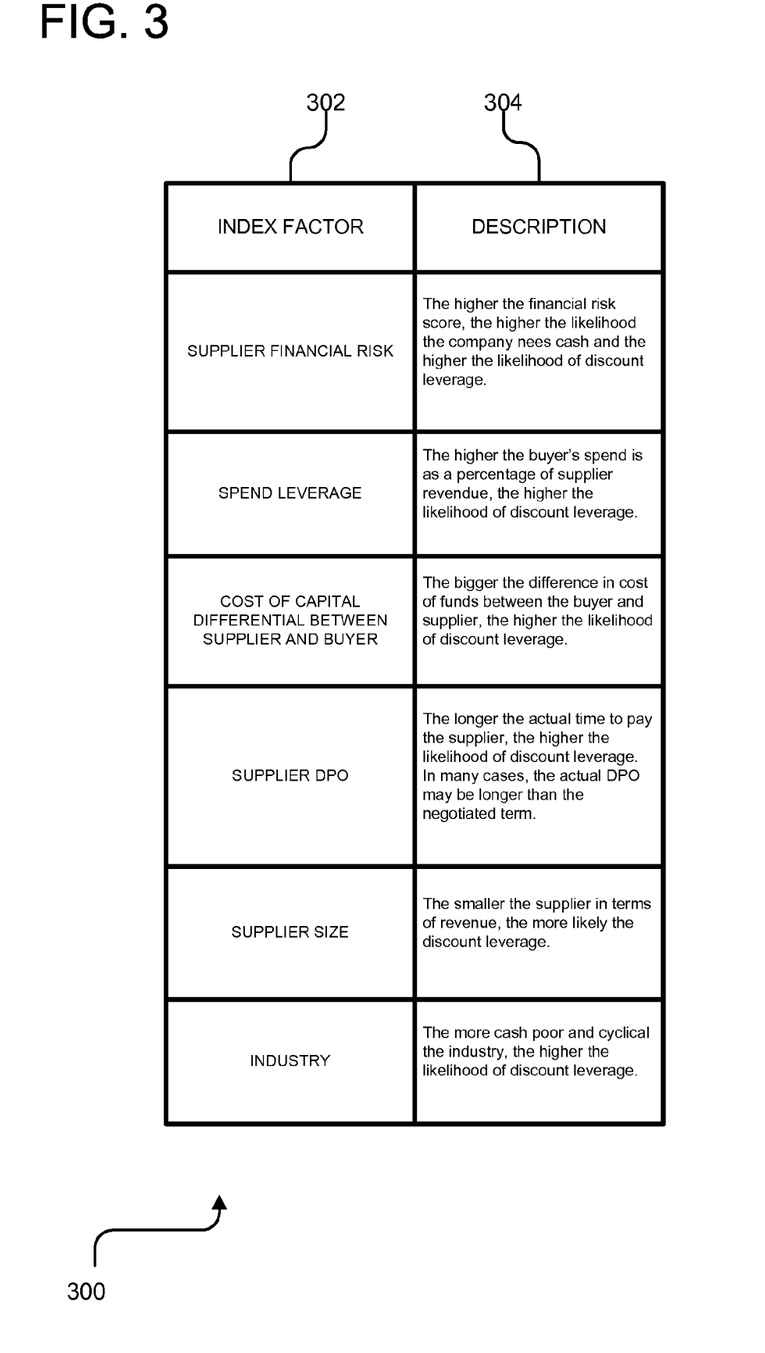
FIG. 3 is a chart illustrating several index factors, and their related descriptions, in accordance with embodiments of the invention.

With reference to FIG. 3, there is shown a chart 300 illustrating several index factors, and their related descriptions, in accordance with embodiments of the invention.

Chart 300 depicts various index factors 302, and their relevant descriptions 304. The index factors can include supplier financial risk, spend leverage, the cost of capital differential between the supplier and the buyer, the supplier DPO, the supplier size, and the industry that the supplier is in.

Each of these index factors has relevance to the relative negotiating postures of the buyer and the supplier. For example, with supplier financial risk, the higher the financial risk score, the higher the likelihood the company needs cash and the higher the likelihood of discount leverage. With regard to spend leverage, the higher the buyer's spend is as a percentage of supplier revenue, the higher the likelihood of discount leverage.

With regard to the cost of capital differential between the supplier and the buyer, the bigger the difference in cost of funds between the buyer and supplier, the higher the likelihood of discount leverage. As for the supplier DPO, the longer the actual time to pay the supplier, the higher the likelihood of discount leverage. In many cases, the actual DPO may be longer than the negotiated term. With regard to supplier size, the smaller the supplier in terms of revenue, the more likely the discount leverage. And finally, with regard to the specific industry of the supplier, the more cash poor and cyclical the industry, the higher the likelihood of discount leverage.

The discount leverage index value (DLIV) can be calculated by way of a discount leverage index function. An exemplary function can be:

DLIV=f(SERscore, SpendLeverage, SupplierSize, SupplierDPO, Industry)

Where:

SERscore is the Dun & Bradstreet (D&B) score that assesses financial stress;

SpendLeverage is the buyer's spend as a percentage of supplier revenue;

SupplierSize is the annual revenue of the supplier;

SupplierDPO is the disburser's average time to pay the supplier; and

Industry is the supplier's industry, categorized based on, for example, industry SIC (Standard Industrial Classification) or NAICS (North American Industry Classification System) code. In some embodiments, the variables can be equally weighted. In other embodiments, different variables can have different weights, based on a perceived value, as a matter of application specific design choice.

Figure 4:
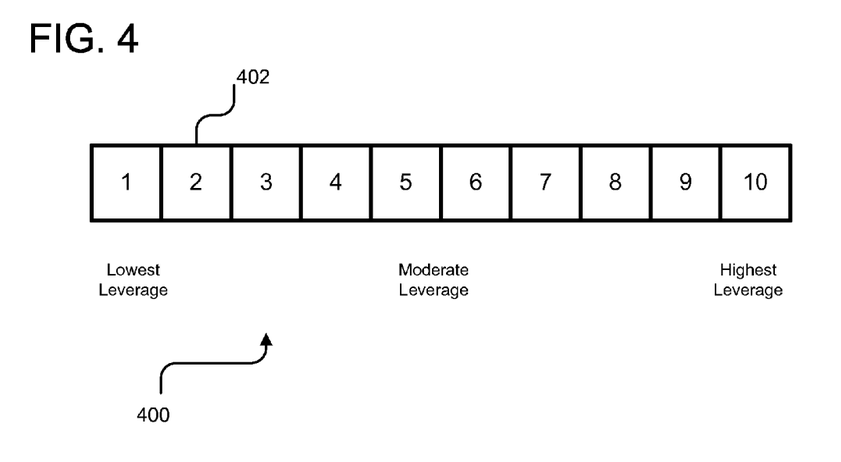
FIG. 4 is a visual depiction of a discount index, in accordance with embodiments of the invention.

With reference to FIG. 4, there is shown a visual depiction of a discount index 400, in accordance with embodiments of the invention. The index 400 is divided into a number of segments 402 on a scale. The scale ranges from lowest leverage to highest leverage.

By way of non-limiting example, a large medical device supplier with a low SERscore, a low SpendLeverage, and 30 day SupplierDPO might have a discount leverage index value of 2. A small maintenance supplier with a high SERscore, a high SpendLeverage, and 75 day SupplierDPO might have a discount leverage index value of 9. Similarly, a laboratory services supplier with a medium SERscore, high SpendLeverage and 45 day Supplier DPO might have a discount leverage index value of 5. These values would then be used to guide the buyer as to with which organizations to pursue discounts, and at what levels.

Figure 5:
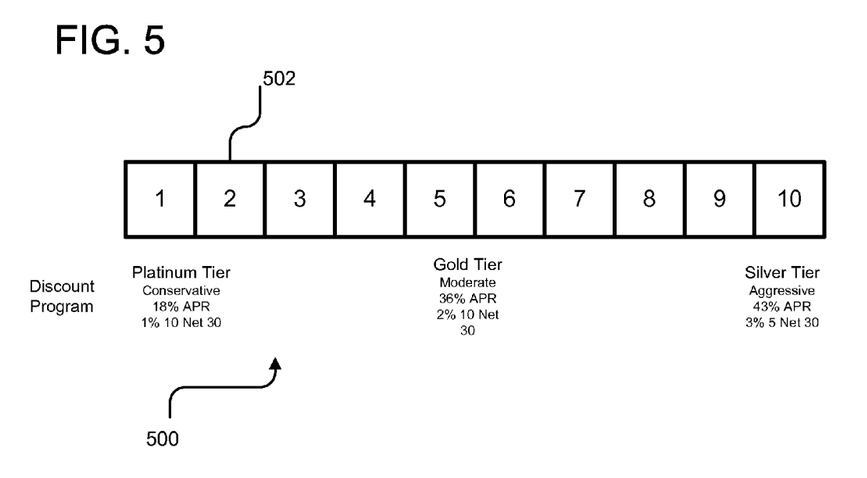
FIG. 5 is a visual depiction of a discount index, including several exemplary discount programs, in accordance with embodiments of the invention.

With reference to FIG. 5, there is shown a visual depiction of a discount index 500, including several exemplary discount programs, in accordance with embodiments of the invention. As with index 400 discussed above, the index 500 is divided into a number of segments 502 on a scale. The scale ranges from lowest leverage to highest leverage. Different discount programs can be assigned to ranges within the index scale, with the most aggressive discounts being sought for the suppliers in the highest discount leverage categories.

Exemplary discount programs can include a conservative 18% APR 1% 10 Net 30 for suppliers over which the company has the lowest leverage, a moderate 36% APR 2% 10 Net 30 for suppliers over which the company has moderate leverage, and an aggressive 43% APR 3% 5 Net 30 for suppliers over which the company has the highest amount of leverage. As is known to those of skill in the art, a discount program of 18% APR 1% 10 Net 30, signifies a payment arrangement where full payment is required if the buyer pays in 30 days, but a 1% discount is given if the buyer pays in 10 days. The 18% signifies the Annual Percentage Rate for the terms, which is the periodic rate times the number of periods in a year.

Thus, by way of embodiments of the invention, a discount leverage index can be developed that can help buying companies or organizations better understand potential discounts across their corporate spend. The companies' resources can then be efficiently deployed to generate cost savings through targeted negotiations of discount rates from suppliers.

In certain embodiments of the invention, all of the steps of the method can be performed by a computer, or computerized system, as described above. In alternative embodiments, one or more of the steps can be performed manually, by a person.

In alternate embodiments of the methods described herein, additional steps may be added, certain steps may be excluded, certain steps may be performed multiple times, and/or the steps may be performed in a different order and/or simultaneously.

One skilled in the art will appreciate that the invention can be practiced by other than the described embodiments, which are presented for purposes of illustration and not by way of limitation. Various arrangements of the described embodiments can be made by those skilled in the art without departing from the spirit and scope of the present invention, which is limited only by the claims that follow.

What is claimed is:

1. A method comprising:
   identifying, by a computer, a discount leverage factor of a supplier, wherein the discount leverage factor comprises information relating to at least one of a supplier financial risk, a spend leverage, a cost of capital differential between the supplier and a buyer, a supplier Days Payable Outstanding (DPO), a supplier size, or a supplier industry;
   calculating, by the computer, a discount index value of the supplier based on the discount leverage factor;
   receiving, by the computer, information related to an actual discount event of the supplier;
   recalculating, by the computer, the discount index value for the supplier based on the discount leverage factor and the information related to the actual discount event; and
   displaying, by the computer, the discount index value of the supplier.

2. The method of claim 1, further comprising forecasting, by the computer, a future discount index value of the supplier.

3. The method of claim 1, further comprising:
   placing, by the computer, the discount index value on a discount index scale;
   defining, by the computer, a plurality of discount leverage regions on the discount index scale; and
   attributing, by the computer, a leverage value to the supplier based on a proximity of the discount index value to one of the discount leverage regions.

4. The method of claim 3, further comprising:
   attributing, by the computer, a predefined discount program to each of the discount leverage regions; and
   attributing, by the computer, a discount program to the supplier based on the proximity of the discount index value to one of the discount leverage regions.

5. The method of claim 1, further comprising providing, by the computer, a plurality of payment options to the supplier, wherein each of the plurality of payment options is associated with different discount terms.

6. A method comprising:
   identifying, by a computer, at least one discount leverage factor of each of a plurality of suppliers, wherein the discount leverage factor comprises information relating to at least one of a supplier financial risk, a spend leverage, a cost of capital differential between the supplier and a buyer, a supplier Days Payable Outstanding (DPO), a supplier size, or a supplier industry;
   calculating, by the computer, a discount index value of each of the plurality of suppliers based on the at least one discount leverage factor and an actual discount event associated with the supplier; and displaying, by the computer, the discount index value for each of the plurality of suppliers on a discount index scale.

7. The method of claim 6, further comprising:

defining, by the computer, a plurality of discount leverage regions on the discount index scale; and attributing, by the computer, a leverage value to each of the plurality of suppliers based on a proximity of each supplier's discount index value to one of the plurality of discount leverage regions.

8. A system comprising:

a memory; and a processor coupled to the memory, the processor configured to:

identify a discount leverage factor of a supplier, wherein the discount leverage factor comprises information relating to at least one of a supplier financial risk, a spend leverage, a cost of capital differential between the supplier and a buyer, a supplier Days Payable Outstanding (DPO), a supplier size, or a supplier industry, calculate a discount index value of the supplier based on the discount leverage factor, receive, information related to an actual discount event of the supplier, recalculate the discount index value for the supplier based on the discount leverage factor and the information related to the actual discount event, and display the discount index value of the supplier.

9. The system of claim 8, wherein the processor is further configured to forecast a future discount index value of the supplier.

10. The system of claim 9, wherein the processor is further configured to:

place the discount index value on a discount index scale, define a plurality of discount leverage regions on the discount index scale, and attribute a leverage value to the supplier based on a proximity of the discount index value to one of the discount leverage regions.

11. The system of claim 10, wherein the processor is further configured to:

attribute a predefined discount program to each of the discount leverage regions, and attribute a discount program to the supplier based on the proximity of the discount index value to one of the discount leverage regions.

12. The system of claim 8, wherein the processor is further configured to provide a plurality of payment options to the supplier, wherein each of the plurality of payment options is associated with a different discount term.

13. The system of claim 8, wherein the processor is further configured to identify a discount leverage factor of a second supplier.

14. The system of claim 13, wherein the processor is further configured to:

calculate a second discount index value for the second supplier based on the information related to the discount leverage factor of the second supplier, receive information related to an actual discount event for the second supplier, recalculate the second discount index value for the second supplier based on the discount leverage factor of the second supplier and the information related to the actual discount event, and display the second discount index value for the second supplier.

15. The system of claim 14, wherein the processor is further configured to:

place the second discount index value on the discount index scale, and attribute a leverage value to the second supplier based on a proximity of the second discount index value to one of the discount leverage regions.

16. The system of claim 15, wherein the processor is further configured to determine an additional discount with at least one of the supplier or the second supplier based on at least one of the leverage values attributed to the supplier or the second supplier.

17. The system of claim 14, wherein the processor is further configured to:

attribute a discount program to the second supplier based on a proximity of the second discount index value to one of the discount leverage regions.

18. A non-transitory computer-readable storage medium storing instructions which, when executed, cause a processor to perform operations comprising:

identifying, by the processor, a discount leverage factor of a supplier, wherein the discount leverage factor comprises information relating to at least one of a supplier financial risk, a spend leverage, a cost of capital differential between the supplier and a buyer, a supplier Days Payable Outstanding (DPO), a supplier size, or a supplier industry;

calculating a discount index value of the supplier based on the discount leverage factor;

receiving information related to an actual discount event of the supplier;

recalculating the discount index value for the supplier based on the discount leverage factor and the information related to the actual discount event; and displaying the discount index value of the supplier.

19. The non-transitory computer-readable storage medium of claim 18, the operations further comprising forecasting a future discount index value of the supplier.

20. The non-transitory computer-readable storage medium of claim 18, the operations further comprising:

placing the discount index value on a discount index scale;

defining a plurality of discount leverage regions on the discount index scale; and attributing a leverage value to the supplier based on a proximity of the discount index value to one of the discount leverage regions.

21. The non-transitory computer-readable storage medium of claim 20, the operations further comprising:

attributing a predefined discount program to each of the discount leverage regions; and attributing a discount program to the supplier based on the proximity of the discount index value to one of the discount leverage regions.

* * * * *